(12) United States Patent
Hu et al.

(10) Patent No.: US 11,074,289 B2
(45) Date of Patent: Jul. 27, 2021

(54) MULTI-MODAL VISUAL SEARCH PIPELINE FOR WEB SCALE IMAGES

(71) Applicant: Microsoft Technology Licensing, LLC., Redmond, WA (US)

(72) Inventors: Houdong Hu, Redmond, WA (US); Yan Wang, Mercer Island, WA (US); Linjun Yang, Sammamish, WA (US); Li Huang, Sammamish, WA (US); Xi Chen, College Park, MD (US); Jiapei Huang, Beijing (CN); Ye Wu, Redmond, WA (US); Arun K. Sacheti, Redmond, WA (US); Meenaz Merchant, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 15/885,568

(22) Filed: Jan. 31, 2018

(65) Prior Publication Data
US 2019/0236167 A1    Aug. 1, 2019

(51) Int. Cl.
*G06F 16/53* (2019.01)
*G06F 16/532* (2019.01)
(Continued)

(52) U.S. Cl.
CPC ...... *G06F 16/532* (2019.01); *G06F 16/24578* (2019.01); *G06F 16/51* (2019.01); *G06F 16/56* (2019.01); *G06F 16/583* (2019.01); *G06F 16/5838* (2019.01); *G06K 9/46* (2013.01); *G06K 9/627* (2013.01); *G06K 9/6215* (2013.01);
(Continued)

(58) Field of Classification Search
CPC ... G06F 16/532; G06F 16/5838; G06F 16/583
See application file for complete search history.

(56) References Cited

U.S. PATENT DOCUMENTS

| 5,247,357 A | * | 9/1993 | Israelsen | ............. | H03M 7/3082 341/106 |
| 9,704,054 B1 | * | 7/2017 | Tappen | ................ | G06K 9/6281 |

(Continued)

OTHER PUBLICATIONS

Ge, et al., "Optimized Product Quantization for Approximate Nearest Neighbor Search", In Proceedings of IEEE Conference on Computer Vision and Pattern Recognition, Jun. 23, 2013, pp. 2946-2953.
(Continued)

*Primary Examiner* — Loc Tran
(74) *Attorney, Agent, or Firm* — Medley, Behrens & Lewis, LLC (57) ABSTRACT

Systems and methods can be implemented to conduct searches based on images used as queries in a variety of applications. In various embodiments, a set of visual words representing a query image are generated from features extracted from the query image and are compared with visual words of index images. A set of candidate images is generated from the index images resulting from matching one or more visual words in the comparison. A multi-level ranking is conducted to sort the candidate images of the set of candidate images, and results of the multi-level ranking are returned to a user device that provided the query image. Additional systems and methods are disclosed.

20 Claims, 7 Drawing Sheets

(51) Int. Cl.

| | |
|---|---|
| *G06T 7/00* | (2017.01) |
| *G06K 9/62* | (2006.01) |
| *G06K 9/46* | (2006.01) |
| *G06N 3/08* | (2006.01) |
| *G06F 16/51* | (2019.01) |
| *G06F 16/56* | (2019.01) |
| *G06F 16/583* | (2019.01) |
| *G06F 16/2457* | (2019.01) |

(52) U.S. Cl.
 CPC ............... *G06N 3/08* (2013.01); *G06T 7/97* (2017.01); *G06K 2209/27* (2013.01); *G06T 2207/20084* (2013.01); *G06T 2207/30196* (2013.01)

(56) References Cited

U.S. PATENT DOCUMENTS

| | | | |
|---|---|---|---|
| 2008/0002916 A1* | 1/2008 | Vincent | ............... G06T 7/33 382/305 |
| 2018/0137551 A1* | 5/2018 | Zheng | ............ G06K 9/00442 |

OTHER PUBLICATIONS

Winder, et al., "Learning Local Image Descriptors", In Proceedings of the IEEE Conference on Computer Vision and Pattern Recognition, Jul. 17, 2007, 8 Pages.

* cited by examiner

MULTI-MODAL VISUAL SEARCH PIPELINE FOR WEB SCALE IMAGES

TECHNICAL FIELD

Embodiments described herein generally relate to methods and apparatus related to electronic searching.

BACKGROUND

Search engines provide a user the ability to search websites for information that matches a query generated by the user. The identification of these websites allows the user to perform a number of different activities. Such activities can range from research on a topic that is defined by the query to acquisition of a product defined by the topic. Typical engines perform searches on the query provided as a text. Web searches may also be performed based on searches defined by images that are provided as the query. To provide a user with the capability to perform complex searches in a short period, enhancements to operation of search engines is needed.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a visual search pipeline utilizing multi-modal information from both text and visual appearance is implemented. Visual features from a learning machine are used to dramatically improve the precision and recall of retrieval of images from an image search engine that operates on an input image to provide images from websites on a network, such as but not limited to the Internet. The learning machine operating on the input image can provide information for the image search engine to conduct a network search correlated to the input image. Such a learning machine may be realized by a neural network or artificial intelligence machine. For example, the neural network may be a deep neural network (DNN). With an inverted index based on product quantization (PQ), visual features from a DNN are used to dramatically improve the precision and recall of the image retrieval, yet are still efficient enough to support web-scale image databases.

A neural network, sometimes referred as an artificial neural network, is a computing system based on consideration of biological neural networks of animal brains. Such systems progressively improve performance, which is referred to as learning, to perform tasks typically without task-specific programming. For example, in image recognition, a neural network may be taught to identify images that contain an object by analyzing example images that have been tagged with a name for the object and, having learnt the object and name, use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, which strength is a parameter.

A DNN is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed and the sum is passed through what is called a node's activation function, to determine whether and to what extent that signal progresses further through the network to affect the ultimate outcome. A DNN uses a cascade of many layers of nonlinear processing units for feature extraction and transformation. Each successive layer uses the output from the previous layer as input. Higher level features are derived from lower level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed to map training examples to correct output. In training, if the cost function value is not within a pre-determined range, based on the known training images, a backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In various embodiments, the visual search pipeline may be implemented using a number of processing devices coordinated to process a query received from a user device. With respect to the user and the user device, the visual search pipeline may be arranged to operate in a cloud. Typically, the term "cloud" with respect to data processing and communicating refers to a datacenter of servers that is connected to the Internet. However, cloud may refer to any network or combinations of networks. A cloud can include a wide area network (WAN) like the public Internet or a private, national or global network, and may include a local area network (LAN) within an organization providing the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

Figure 1:
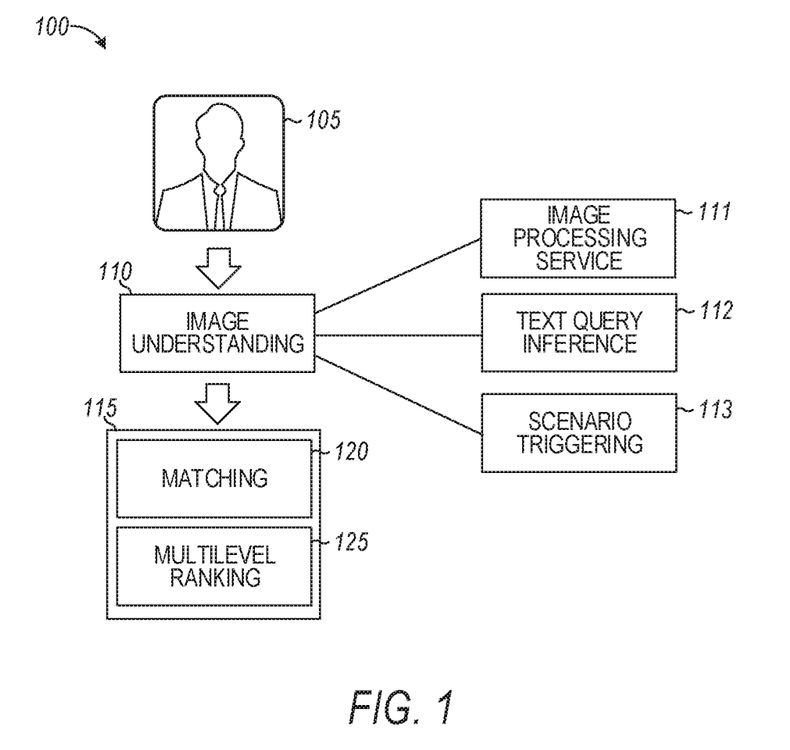
FIG. 1 shows features of a pipeline for a multi-modal visual search that is operable to apply to web scale images, in accordance with various embodiments.

FIG. 1 shows features of a pipeline 100 for a multi-modal visual search that is operable to apply to web scale images. The terminology "web-scale images" is used to describe the number of images. It means that the number of images is comparable to that of all the images on the entire World Wide Web. It is often used in the search engine industry because that is the scale to which general search engines like Bing® or Google® deal. Empirically, when one mentions web-scale images, the number is in a level of tens to hundreds of billions. Pipeline 100 can include a query image input 105 from a user device for search. Herein, a query image is an image that is used as a query from a device that inputs the image to a system. The system operates on the input image and provides a result to the device. The search can be conducted with respect to an index of images stored in an index database. The index images in the index database can be scraped from web pages on the Internet. The index images are part of an image index that may include billions of images. The image index may be distributed over a number of different databases. The image index can be generated from web searches that are already performed prior to the input of the query image.

Pipeline 100 can include image understanding 110 of the query image and index image selection 115, where the image selection 115 can include matching 120 and multilevel ranking 125. Image understanding 110 and index image selection 115 are realized by apparatus that include one or more processors that execute stored instructions to perform operations of image understanding, image matching, and multilevel ranking of selected images identified from the image matching.

As a first procedure in the query-image understanding process 110, an image processing service 111 is run to perform object detection and extraction of various image features. Extraction of various image features can include extraction, from the query image, of DNN features, recognition features, and additional features used for duplicate detection. Herein, DNN features refer to a vector produced by DNN, from a given image input to the DNN, to describe the content of the given image.

A DNN is a type of deep learning architecture that uses one or more learning models. It consists of an ordered stack of image processing operations, called layers. The final stack/layer is usually used for classification. For example, this classification can be used to identify whether the given image is a photo of an apple, an orange, or a dog. The DNN feature is the output of the second to the last layer, that is, the input to the last layer, which has been proven to be able to describe the content of an image. Training data is collected mainly by labeling, which can include human labeling, and web scraping, where training data can also be leveraged form open source datasets. Training datasets broadly cover thousands of major categories in daily life, with in-depth training datasets collected for specific domains, such as but not limited to shopping. State-of-art neural networks used in the deep teaming model training in image understanding 110 can include, for example but not limited to, Alexnet, Caffenet, Zfnet, Googlenet, and Resnet. Various loss functions are used to serve different purposes such as image classification, object detection, and image-text semantic embedding. In various embodiments, Caffe is used as a deep learning framework for model training in image understanding 110.

In image understanding 110, a next process, which may be subsequent to image processing service 111, can include text query inference 112. Here, a best text query may be generated to represent the input image, such as a "best representative query" (BRQ). A BRQ may identify a minimal and human-readable set of terms that can identify the key concept in the image. BRQs are used in a Bing® image search, where Bing® is a web search engine owned and operated by Microsoft Corporation®. Various application programming interfaces (APIs) are available via a Bing® image search product. Text query inference 112 can operate on a caption associated with a web page. In various embodiments, web page text metadata associated with the query image is used to generate a text query to describe the image query.

In image understanding 110, a scenario triggering 113 may be run, for example subsequent to text query inference 115. Scenario triggering 113 can include triggering a model to identify different scenarios for search by image. Scenario triggering 113 may include features from triggering operations used in search engines. For instance, when from the query image a shopping intent is detected, searches are directed to show a specific experience, rich in a particular segment of shopping. The shopping intent may be determined from training classification of objects in the query image. For a triggering model, a high-level classification model is built to trigger different scenarios. If shopping intent is detected in the query image, scenarios related to shopping are triggered. If research on a specific topic is detected in the query image, scenarios related to the specific research topic are triggered. The triggering can identify material in the index of images against which a comparison with the query image is made.

Once the image understanding phase is complete, matching 120 of image selection 115 is entered. In order to implement search by image inside of an existing index serve stack designed mostly for text search, such as Bing index serve stack, a text-like representation for the image feature vector is generated. To accomplish this search, a technique known in the vision area as visual words is employed. This technique allows a system to quantize a dense feature vector into a set of discrete visual words, which are essentially a clustering of similar feature vectors into clusters, using a joint k-means algorithm. The visual words are then used to narrow down a set of candidates from billions to several millions.

Figure 2:
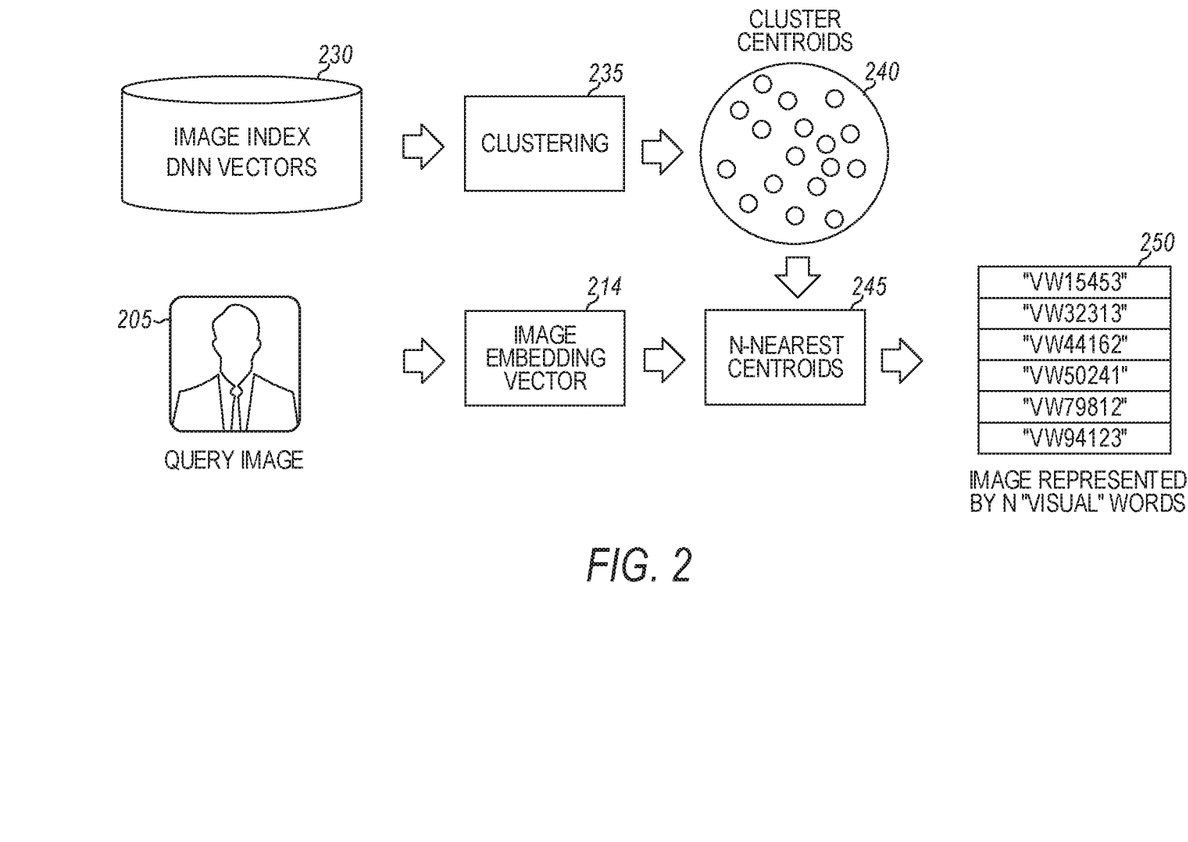
FIG. 2 is a representation of a technique to quantize a dense feature vector into a set of discrete visual words, in accordance with various embodiments.

FIG. 2 is a representation of a technique to quantize a dense feature vector into a set of discrete visual words. This technique includes using a joint k-means algorithm. A k-means algorithm partitions i observations into k clusters where each observation belongs to a cluster with the nearest distance. A query image 205 to compare to index images is converted to an image embedding vector 214 by subjecting the query image 205 to a DNN model that expresses the query image as a query vector of multiple feature dimensions. A target in this example technique can include assigning N visual words for each of M index images as training data. A training algorithm is conducted with respect to the M index images. The M index images are input to a DNN model, which outputs image index DNN vectors (also referred to as DNN encoders) that are stored in database 230. A multiple of N, L×N, codewords can be generated by a single pass of a k-means clustering algorithm on M DNN encoders from database 230, providing clustering 235. From clustering 235, a cluster of centroids 240 is generated, where a centroid is a geometric center of a set of DNN vectors. The L×N codewords are divided into N groups completing the training algorithm.

For each image, N visual words are generated by finding the codeword which has closest distance with its DNN encoder for each of the N groups. A correlation between the DNN query vector and the DNN index image vectors is calculated. In a visual search system, as taught herein, there can be N visual words for each index image. The set 250 of N visual words present a set of N index images represented by the N visual words. The visual words can be used to conduct matching such that if the query visual words match some index image visual words, these matching index image visual words are selected. The index images of these matched index image visual words are kept as candidate images. The visual words can then be discarded. Only index images with visual words matched with the query image are kept, and subsequently sent to the first ranker of a set of multiple rankers.

For example, there may be tens of billions of images in a visual search index. For a query image in this visual search index, it may take less than 200 milliseconds to retrieve visual search results. For a query image not in this visual search index, additional time is taken to perform query feature extraction, with an overall latency that is around 1 second. Aggressive latency optimizations such as graphics processing unit (GPU) computation, multithreading computation, or parallel computation may be employed in different stages of visual search framework.

After the matching process 120 shown in FIG. 1, a stage of multilevel ranking 125 is entered. In various embodiments, a Lambda-mart algorithm is used as a ranker of candidate index images. A Lambda-mart algorithm is a known algorithm that is a multivariate regression tree model with a ranking loss function. Various features may be used to train the ranker. These features can include multiple product quantization (PQ) features based on different training data, network structure, and loss functions. The features used in a PQ procedure can be derived from multiple DNN feature trainings using one or more of different DNN network structures, different loss functions, and different training data. The set of features can include category matching, color matching, matching face-related features. The set of features can also include text matching features, such as but not limited to, a BRQ query and matching a document stream.

In a first level of ranking, one feature of the candidate index images is used to reduce the number of candidate index images. In the next level of ranking, a large number of features is included, for example but not limited to thousands of features. For this level of ranking, a process can include one or more of the PQ feature, some category matching, and the image caption. PQ features can provide an efficient mechanism to speed up calculations in which millions of image candidates can be ranked based on feature vector distances. A PQ procedure can allow for image searching to be performed in real-time. With respect to signal processing and data processing, by real-time is meant completing some signal/data processing within a time that is sufficient to keep up with an external process, such as conducting an image search on a query image received from a communication channel in an acceptable user timeframe such as, but not limited to, a range within a second. In various embodiments, an innovative algorithm, developed by Microsoft Research in collaboration with University of Science and Technology of China, called Optimized Product Quantization is used. For more information, see the paper, "Optimized Product Quantization for Approximate Nearest Neighbor Search" by Tiezheng Ge, Kaiming He, Qifa Ke, and Jian Sun, which paper is incorporated by reference in its entirety. In this approach, the original high-dimensional vector is decomposed into many low-dimensional sub-vectors that are then quantized separately.

Figure 3:
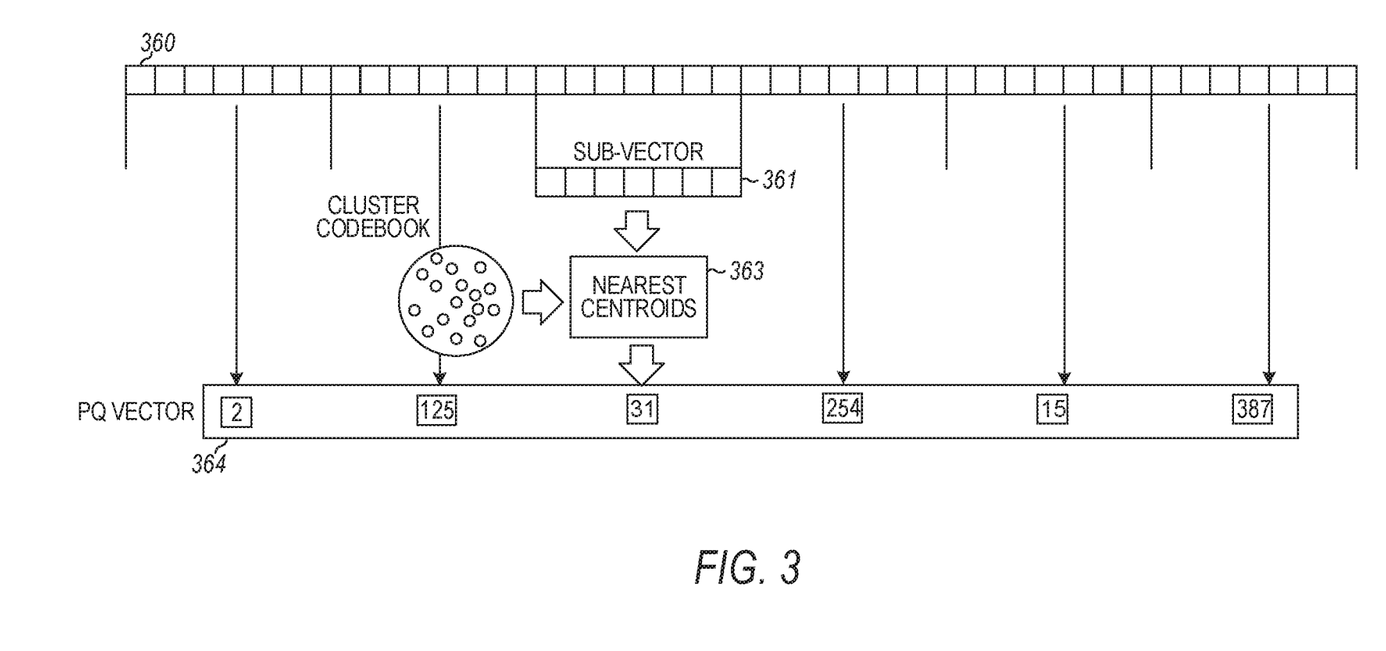
FIG. 3 is an illustration of a high-dimensional vector decomposed into many low-dimensional sub-vectors to form a product quantization vector, in accordance with various embodiments.

FIG. 3 is an illustration of a high-dimensional vector 360 decomposed into many low-dimensional sub-vectors 361 to form a PQ vector 364. A calculation of a sub-vector 361 with a cluster codebook 362 is used to generate a nearest centroid 363 of a number of elements. A codebook is a set of codewords. After quantization is complete, distances between the query-image and result-image vectors are calculated. A Euclidean distance calculation can be conducted. However, in various embodiments, instead of using a conventional Euclidean distance calculation, a table lookup against a set of pre-calculated values is performed to speed things up even further.

With respect to FIG. 3, consider the following example in which a target is to assign 25 bytes for each 100-dimensional DNN encoder from the index images. In a first step of a training algorithm, each 100-dimensional DNN encoder is divided into 25 four-dimensional vectors. In another step of the training algorithm, for each four-dimensional vector, a k-means clustering algorithm is run, and 256 codebooks are generated. For new 100-dimensional DNN encoders, each new 100-dimensional DNN encoder is divided into 25 four-dimensional vectors. For each four-dimensional vector, the nearest codebook identification (ID) is determined. Each DNN encoder can be represented by 25 codebook IDs of 25 bytes forming a PQ vector.

Figure 4:
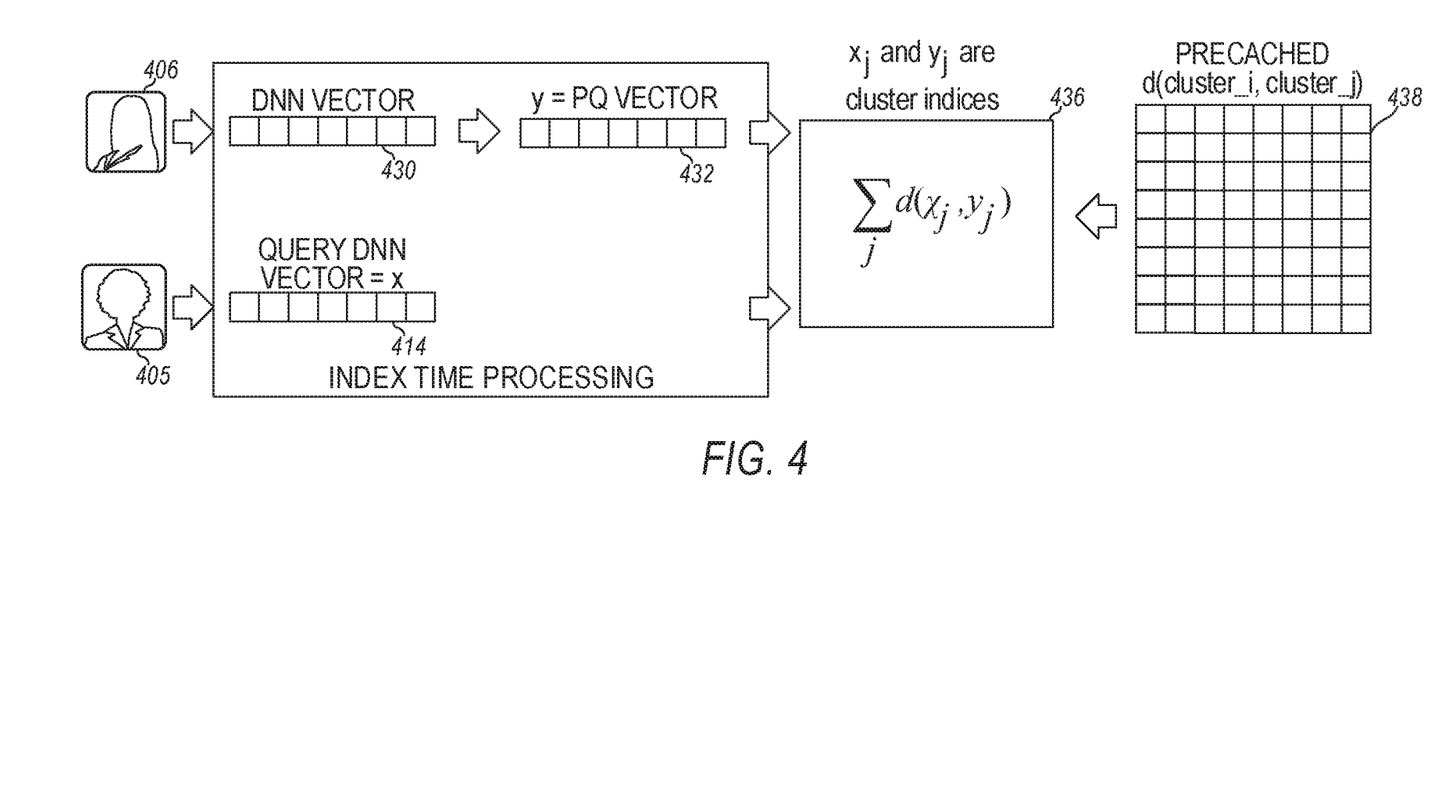
FIG. 4 is representation of distance calculation between a query image vector and a candidate index image vector, in accordance with various embodiments.

FIG. 4 is representation of distance calculation between a query image vector and a candidate index image vector. Query image 405 is operated on to form a query DNN vector 414, x, and index image 406 is operated on to form a DNN vector 430. Quantization of DNN vector 430 provides PQ vector, y. The distance between a query image vector and a candidate index image vector is generated as a sum 436 of distances between cluster indices $x_j$ and $y_j$. Distances between cluster_i and cluster_j can be pre-calculated and pre-cached in table 438. Table 438 may be generated by forming clusters using each index image as a possible query image for each of the other index images.

With respect to FIG. 4, consider the following example. From a query image, a 100-dimensional DNN encoder is generated, providing a query 100-dimensional vector. From an index image, which can also be referred to as a document image, a 100-dimensional index vector is generated. The 100-dimensional index vector is re-constructed by 25 codebook IDs, providing a 100-dimensional index PQ vector. An approximate distance between the query 100-dimensional vector and the 100-dimensional index PQ vector is calculated.

As a result of such optimized product quantization, a candidate set can be reduced from millions to thousands. At this point, a more expensive operation, in terms of resources used, may be performed to rank the images more accurately. After multiple levels of ranking, a de-duplication process is executed to remove any duplicate images from the results. After such a de-duplication process, a remaining set of images is taken as the final result set. This final result set is returned to the user device that provided the query image.

Figure 5:
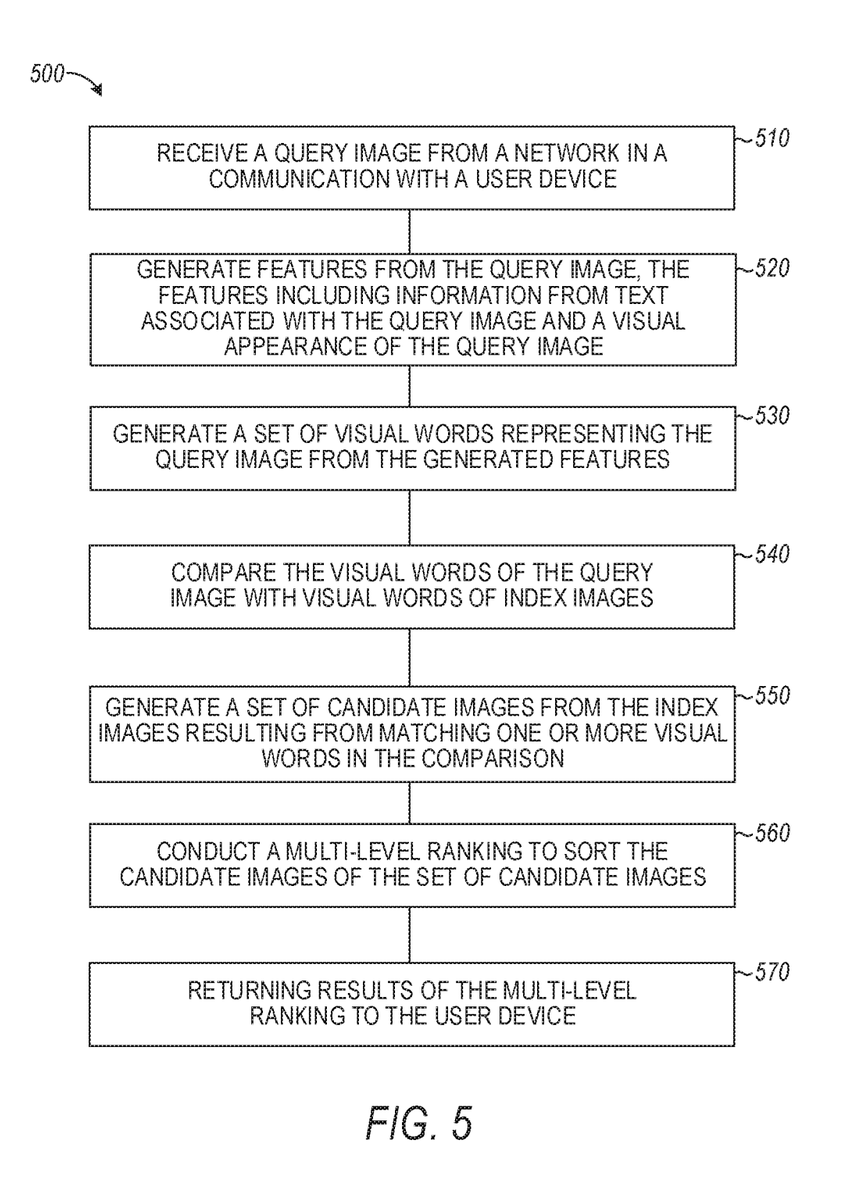
FIG. 5 is a flow diagram of features of an example processor implemented method of image searching, in accordance with various embodiments.

FIG. 5 is a flow diagram of features of an embodiment of an example method 500 of conducting an image search. At 510, a query image is received from a network in a communication with a user device. At 520, features from the query image are generated, the features including information from text associated with the query image and a visual appearance of the image. Generating features from the query image can include applying the query image to a deep neural network to extract a set of deep neural network features from the query image. The deep neural network may be realized by a number of different types of deep neural networks.

At 530, a set of visual words representing the query image is generated from the generated features. At 540, the visual words of the query image are compared with visual words of index images. The visual words of the query image can be compared with visual words of index images of an image index database by comparing DNN vectors of index images with a DNN vector of the query image. At 550, a set of candidate images is generated from the index images resulting from matching one or more visual words in the comparison.

At 560, a multi-level ranking is conducted to sort the candidate images of the set of candidate images. Conducting the mid-level ranking can include decomposing a deep neural network query image vector generated from the query image into a number of sub-vectors to form a product quantization vector of the query image; and for each candidate image of the set of candidate images, decomposing a deep neural network candidate image vector generated from the candidate image into a number of sub-vectors to form a product quantization vector of the candidate image; and calculating a distance between the product quantization vector of the candidate image and the product quantization vector of the query image. Such methods can include generating a reduced set of candidate images from the set of candidate images using the distances corresponding to each of the candidate images of the set of candidate images, and using the reduced set of candidate images to provide the return results of the multi-level ranking to the user device. Calculating the distance between the product quantization vector of the candidate image and the product quantization vector of the query image can include performing a table lookup of pre-calculated values. At 570, results of the multi-level ranking are returned to the user device.

Variations of method 500 or methods similar to method 500 can include a number of different embodiments that may be combined depending on the application of such methods and/or the architecture of systems in which such methods are implemented. Such methods can include generating a text query to represent the query image for a search by image in a database of index images. Generating the text query to represent the query image can include using a caption associated with the query image. Variations of method 500 or methods similar to method 500 can include operations limiting the search by image in the database of index images based on a triggering model to identify an intended search scenario from the query image. Such methods can include generating the triggering model from a training classification of objects in the query image.

Elements associated with the architectures, as taught herein, may communicate over a network. The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN), a wide-area network (WAN), or a combination of LANs and/or WANs, such as the Internet. The various devices coupled to network may be coupled to the network via one or more wired or wireless connections.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine, for example, a computer. For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner, in an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform one or more methodologies described herein.

In various embodiments, a machine-readable storage device comprises instructions stored thereon, which, when executed by a set of processors of a system, cause the system to perform operations, the operations comprising one or more features similar to or identical to features of methods and techniques described with respect to method 500, variations thereof, and/or features of other methods taught herein. The physical structures of such instructions may be operated on by the set of processors, which set can include one or more processors. Executing these physical structures can cause the machine to perform operations comprising operations to: generate features from a query image received from a network in a communication with a user device, the features including information from text associated with the query image and a visual appearance of the query image; generate a set of visual words representing the query image from the generated features; compare the visual words of the query image with visual words of index images; generate a set of candidate images from the index images resulting from matching one or more visual words in the comparison; conduct a multi-level ranking to sort the candidate images of the set of candidate images; and return results of the multi-level ranking to the user device. The operations to generate features from the query image can include operations to apply the query image to a deep neural network to extract a set of deep neural network features from the query image.

The operations to conduct the multi-level ranking can include operations to: decompose a deep neural network query image vector generated from the query image into a number of sub-vectors to form a product quantization vector of the query image; for each candidate image of the set of candidate images, decompose a deep neural network candidate image vector generated from the candidate image into a number of sub-vectors to form a product quantization vector of the candidate image; and calculate a distance between the product quantization vector of the candidate image and the product quantization vector of the query image; generate a reduced set of candidate images from the set of candidate images using the distances corresponding to each of the candidate images of the set of candidate images; and use the reduced set of candidate images to provide the return results of the multi-level ranking to the user device.

Figure 6:
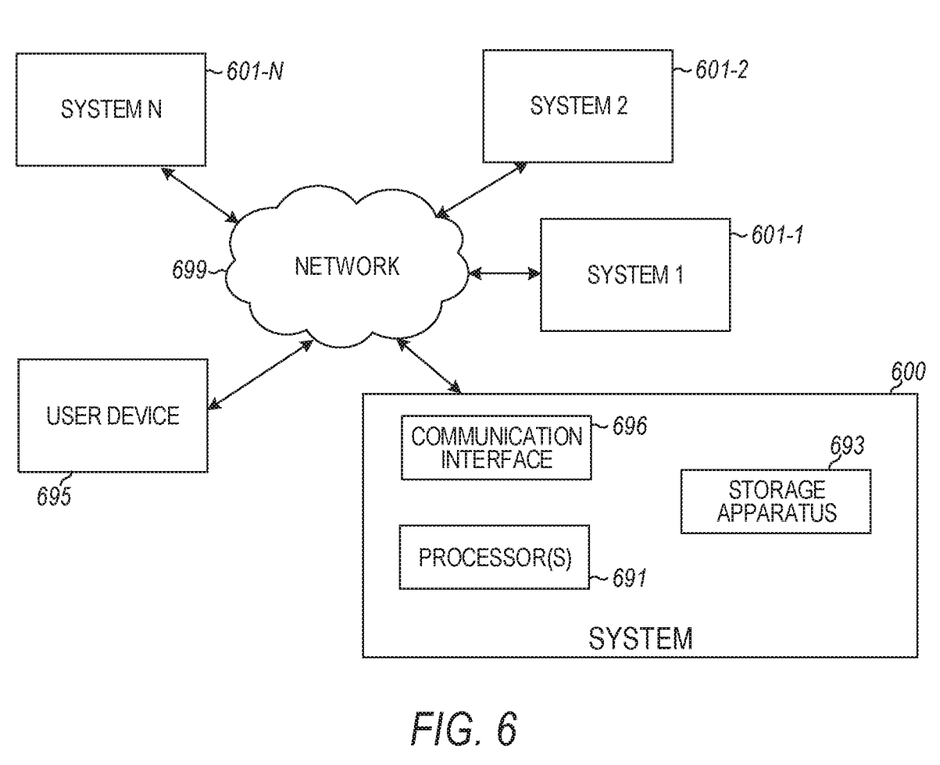
FIG. 6 is a block diagram of an embodiment of an example system 600 capable of conducting an image search, in accordance with various embodiments.

FIG. 6 is a block diagram of an embodiment of an example system 600 capable of conducting an image search. System 600 comprises a communication interface 696, a set of processors 691, and a storage apparatus 693. Communication interface 696 is arranged to receive a query image from a network 699 in a communication with a user device 695. The set of processors 691 are realized by one or more processors. The storage apparatus 693 comprises instructions, which when executed by the set of processors 691, cause the system 600 to perform operations associated with image searching. The operations can include operations to: generate features from the query image, the features including information from text associated with the query image and a visual appearance of the query image; generate a set of visual words representing the query image from the generated features; compare the visual words of the query image with visual words of index images; generate a set of candidate images from the index images resulting from matching one or more visual words in the comparison; conduct a multi-level ranking to sort the candidate images of the set of candidate images; and return results of the multi-level ranking to the user device. Operations to generate features from the query image can include operations to apply the query image to a deep neural network to extract a set of deep neural network features from the query image.

Variations of a system related to conducting an image search, as taught herein, can include a number of different embodiments that may be combined depending on the application of such systems and/or the architecture in which systems are implemented. The operations of such a system can include operations to generate a text query to represent the query image for a search by image in a database of index images. The operations to generate a text query to represent the query image can include operations to use a caption associated with the query image. The operations can include operations to limit the search by image in the database of index images based on a triggering model to identify an intended search scenario from the query image. The triggering model to identify the intended search scenario is generated from a training classification of objects in the query image.

Such systems are capable of executing operations to conduct the multi-level ranking to include operations to decompose a deep neural network query image vector generated from the query image into a number of sub-vectors to form a product quantization vector of the query image, and for each candidate image of the set of candidate images, to decompose a deep neural network candidate image vector generated from the candidate image into a number of sub-vectors to form a product quantization vector of the candidate image and calculate a distance between the product quantization vector of the candidate image and the product quantization vector of the query image. Operations to conduct the multi-level ranking can include operations to generate a reduced set of candidate images from the set of candidate images using the distances corresponding to each of the candidate images of the set of candidate images, and to use the reduced set of candidate images to provide the return results of the multi-level ranking to the user device. Operations to calculate the distance between the product quantization vector of the candidate image and the product quantization vector of the query image can include performing a table lookup of pre-calculated values.

Variations of a system related to conducting an image search, as taught herein, can include operations of the system structured as an image search pipeline to provide a service for user devices that upload one or more query images to the system. For example, user device 695 can include a user interface (UI) to communicate over network 699 with system 600. The UI of user device 695 can include instrumentalities to select a query image to transmit over network 699 to system 600, for system 600 to conduct searches based on the query image to provide a service to user device 695. For example, a query image having objects related to shopping can be sent to system 600. Search results from an image search by system 600, as taught herein, is returned to user device 695. The search results may include products on web sites corresponding to the query image along with web addresses for each returned image from the search. The UI of user device can be arranged to select a product from the received image results, establish a communication with the website of the selected product, and interact with the website to purchase the selected product. User device 695 can include an API to interact with system 600 that operates as a service to provide a visual search pipeline and to interact with other systems associated with the search results provided to user device 695 by system 600.

The topic of the search is not limited to shopping. The topic of an image search can be a research topic identifiable in a query image. For a research topic, returned results can include a set of images correlated to the query image uploaded to system 600 and identification of websites that include information about the returned image correlated to the query image. This image search for a research topic may provide an efficient mechanism for analysis of the research topic and generation of documents on the research topic and/or its analysis.

System 600 can include one or more APIs for system 600 to operate as a visual search pipeline for a plurality of different types of user devices and to interact with other systems 601-1, 601-2 . . . 601-N to build an image index database for system 600 to operate in real-time with user devices. Storage apparatus 693 may be distributed over one or more of systems 601-1, 601-2 . . . 601-N. System 600 may be structured as a cloud service. System 600 may be located at a data center. System 600 located at a data center may be distributed over a number of hardware structures to provide functionalities of communication interface 696, the set of processors 691, and storage apparatus 693. With respect to signal processing and data processing, by real-time is meant completing some signal/data processing within a time that is sufficient to keep up with an external process, such as conducting an image search on a query image received from a communication channel in an acceptable user timeframe.

Figure 7:
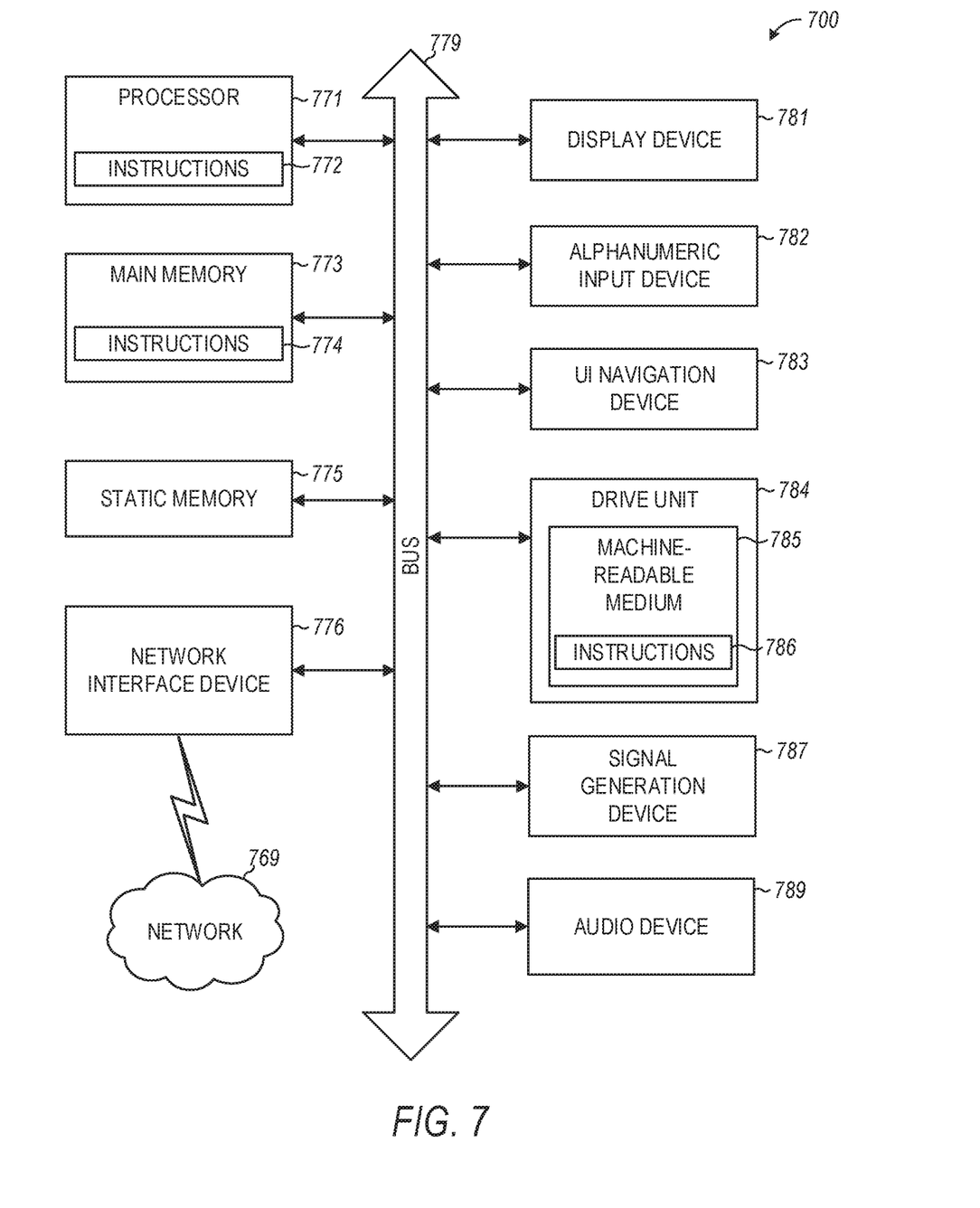
FIG. 7 is a block diagram illustrating features of an example system, within which a set or sequence of instructions may be executed to cause the system to perform any one of the methodologies discussed herein, in accordance with various embodiments.

FIG. 7 is a block diagram illustrating features of an embodiment of an example system 700, within which a set or sequence of instructions may be executed to cause the system to perform any one of the methodologies discussed herein. System 700 represents one or more machines associated with an image search and architectures, as taught herein. System 700 may be a machine that operates as a standalone device or may be networked to other machines. In a networked deployment, the system 700 may operate in the capacity of either a server or a client machine in server-client network environments, or it may act as a peer machine in peer-to-peer (or distributed) network environments. Further, while system 700 is shown only as a single machine, the term "system" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

System 700 can include one or more processors 771, a main memory 773 and a static memory 777, which communicate with each other via a link 779 (e.g., a bus). System 700 may further include a video display unit 781, an alphanumeric input device 782 (e.g., a keyboard), and a user interface (UI) navigation device 783 (e.g., a mouse). Video display unit 781, alphanumeric input device 782, and UI navigation device 783 may be incorporated into a touch screen display. A UI of system 700 can be realized by a set of instructions that can be executed by processor 771 to control operation of video display unit 781, alphanumeric input device 782, and UI navigation device 783. The UI can control real-time image searches embedded in instructions in components of system 700.

System 700 may additionally include a storage device 784 (e.g., a drive unit), a signal generation device 787 (e.g., a speaker), a network interface device 776, and one or more sensors (not shown), such as a global positioning system (GPS) sensor, compass, accelerometer, or other sensor. System 700 may also include an audio device 789 having an audio input, such as for example a microphone, and an audio output, such as for example a speaker. The communications may be provided using link 779 in a wired transmission or a wireless transmission.

Storage device 784 can include a machine-readable medium 785 on which is stored one or more sets of data structures and instructions 786 (e.g., software) embodying or utilized by any one or more of the methodologies or functions described herein. The instructions 786 may also reside, completely or at least partially, within the main memory 773, static memory 775, and/or within the processors 771 during execution thereof by system 700, with main memory 773, static memory 775, and processors 771 also constituting machine-readable media. Components of image searching and associated architecture, as taught herein, can be distributed as modules having instructions in one or more of the machine-readable medium 785, main memory 773, static memory 775, and/or within the processors 771 during execution thereof by system 700.

While the machine-readable medium 785 is illustrated in an example embodiment to be a single medium, the term "machine-readable medium" may include a single medium or multiple media (e.g., a centralized or distributed database, and/or associated caches and servers) that store the one or more instructions 786. The term "machine-readable medium" shall also be taken to include any tangible medium that is capable of storing instructions for execution by the machine and that cause the machine to perform any one or more of the methodologies taught herein or that is capable of storing data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 786 may further be transmitted or received over a communications network 769 using a transmission medium via the network interface device 776 utilizing any one of a number of well-known transfer protocols (e.g., HTTP). In addition, communications network 769 may operably include a communication channel propagating messages between entities for which a query image can be transmitted and results of searching on the query image can be transmitted back to the source that transmitted the query image. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any medium that is capable of carrying messages or instructions for execution by a machine, and includes digital or analog communications signals.

In various embodiments, a visual search pipeline, operable on a query image input to the pipeline, can be implemented using multiple ranking processes on a set of visual words generated from a set of index images and the query image filtered by a matching process. Visual words are generated with respect to the set of index images and the query. The visual words for the set of index images are processed, for example by a k-means algorithm, to narrow to a set of candidate index visual words. The filtering is performed by matching the candidate index visual words to the query visual word. The multiple ranking processes can be operated in a sequential manner beginning with the visual words from the filtering. Such a visual search pipeline provides an efficient pipeline in which at each of a number of stages of the pipeline, a respective set of candidate results of the search is significantly reduced. At the end of the visual search pipeline, images are transmitted, as search results, to the device that provided the query image.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
    a communication interface arranged to receive a query image from a network in a communication with a user device;
    a set of processors;
    a storage apparatus comprising instructions, which when executed by the set of processors, cause the system to perform operations to:
        generate feature values from the query image, the feature values extracted from nodes in a hidden layer of a deep neural network that was provided the query image;
        generate a set of visual words representing the query image from the generated feature values;
        compare the visual words of the query image with visual words of index images;
        generate a set of candidate images from the index images resulting from matching one or more visual words in the comparison;
        conduct a multi-level ranking to sort the candidate images of the set of candidate images; and
        return results of the multi-level ranking to the user device.

2. The system of claim 1, wherein the operations include operations to generate a text query to represent the query image for a search by image in a database of index images.

3. The system of claim 2, wherein the operations to generate a text query to represent the query image includes operations to use a caption associated with the query image.

4. The system of claim 2, wherein the operations include operations to limit the search by image in the database of index images based on a triggering model to identify an intended search scenario from the query image.

5. The system of claim 4, wherein the triggering model to identify the intended search scenario is generated from a training classification of objects in the query image.

6. The system of claim 1, wherein the operations to conduct the multi-level ranking include operations to:
    decompose a deep neural network query image vector generated from the query image into a number of sub-vectors to form a product quantization vector of the query image;
    for each candidate image of the set of candidate images, decompose a deep neural network candidate image vector generated from the candidate image into a number of sub-vectors to form a product quantization vector of the candidate image; and
    calculate a distance between the product quantization vector of the candidate image and the product quantization vector of the query image;
    generate a reduced set of candidate images from the set of candidate images using the distances corresponding to each of the candidate images of the set of candidate images; and
    use the reduced set of candidate images to provide the return results of the multi-level ranking to the user device.

7. The system of claim 6, wherein operations to calculate the distance between the product quantization vector of the candidate image and the product quantization vector of the query image includes performing a table lookup of pre-calculated values.

8. The system of claim 1, wherein the operations are arranged as an image search pipeline to provide a service for user devices that upload one or more query images to the system.

9. A method performed by a computing system, the method comprising:
    receiving a query image from a network in a communication with a user device;
    providing the query image to a deep neural network, wherein the deep neural network comprises hidden layers, and further wherein each hidden layer in the hidden layers comprises several nodes;
    generating features values from the query image, the feature values extracted from nodes in a hidden layer of the hidden layers of the deep neural network;
    generating a set of visual words representing the query image from the generated feature value;
    comparing the visual words of the query image with visual words of index images;
    generating a set of candidate images from the index images resulting from matching one or more visual words in the comparison;
    conducting a multi-level ranking to sort the candidate images of the set of candidate images; and
    returning results of the multi-level ranking to the user device.

10. The method of claim 9, wherein the method includes generating a text query to represent the query image for a search by image in a database of index images.

11. The method of claim 10, wherein generating the text query to represent the query image includes using a caption associated with the query image.

12. The method of claim 10, wherein the method includes operations limiting the search by image in the database of index images based on a triggering model to identify an intended search scenario from the query image.

13. The method of claim 12, wherein the method includes generating the triggering model from a training classification of objects in the query image.

14. The method of claim 9, wherein conducting the multi-level ranking includes:
   decomposing a deep neural network query image vector generated from the query image into a number of sub-vectors to form a product quantization vector of the query image;
   for each candidate image of the set of candidate images,
      decomposing a deep neural network candidate image vector generated from the candidate image into a number of sub-vectors to form a product quantization vector of the candidate image; and
      calculating a distance between the product quantization vector of the candidate image and the product quantization vector of the query image;
   generating a reduced set of candidate images from the set of candidate images using the distances corresponding to each of the candidate images of the set of candidate images; and
   using the reduced set of candidate images to provide the return results of the multi-level ranking to the user device.

15. The method of claim 14, wherein calculating the distance between the product quantization vector of the candidate image and the product quantization vector of the query image includes performing a table lookup of pre-calculated values.

16. A machine-readable storage device comprising instructions, which when executed by a set of processors, cause a system to perform operations, the operations comprising operations to:
   generate feature values from a query image received from a network in a communication with a user device, the feature values extracted from a hidden layer of a deep neural network that was provided the image;
   generate a set of visual words representing the query image from the generated feature values;
   compare the visual words of the query image with visual words of index images;
   generate a set of candidate images from the index images resulting from matching one or more visual words in the comparison;
   conduct a multi-level ranking to sort the candidate images of the set of candidate images; and
   return results of the multi-level ranking to the user device.

17. The machine-readable storage device of claim 16, wherein the operations to conduct the multi-level ranking include operations to:
   decompose a deep neural network query image vector generated from the query image into a number of sub-vectors to form a product quantization vector of the query image;
   for each candidate image of the set of candidate images,
      decompose a deep neural network candidate image vector generated from the candidate image into a number of sub-vectors to form a product quantization vector of the candidate image; and
      calculate a distance between the product quantization vector of the candidate image and the product quantization vector of the query image;
   generate a reduced set of candidate images from the set of candidate images using the distances corresponding to each of the candidate images of the set of candidate images; and
   use the reduced set of candidate images to provide the return results of the multi-level ranking to the user device.

18. The system of claim 1, wherein the hidden layer is a second-to-last layer in the DNN.

19. The method of claim 9, wherein the hidden layer is a second-to-last layer in the DNN.

20. The machine-readable storage device of claim 16, wherein the hidden layer is a second-to-last layer in the DNN.

* * * * *